United States Patent
Barker et al.

(10) Patent No.: US 7,311,427 B2
(45) Date of Patent: Dec. 25, 2007

(54) COVERED ILLUMINATED VANITY MIRROR ASSEMBLY

(75) Inventors: Daniel L. Barker, Hudsonville, MI (US); Steven J. Cieholski, Holland, MI (US); Andrew K. Ruiter, Grand Haven, MI (US); James H. Baas, Holland, MI (US); Robert J. Stenman, Saugatuck, MI (US); Mathias R. Fox, Zeeland, MI (US); Kenneth D. Kreuze, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 33 days.

(21) Appl. No.: 10/535,503

(22) PCT Filed: Nov. 19, 2003

(86) PCT No.: PCT/US03/37196

§ 371 (c)(1),
(2), (4) Date: Dec. 5, 2005

(87) PCT Pub. No.: WO2004/045878

PCT Pub. Date: Jun. 3, 2004

(65) Prior Publication Data

US 2006/0098446 A1 May 11, 2006

(51) Int. Cl.
*F21S 8/10* (2006.01)

(52) U.S. Cl. .................. 362/492; 362/137; 362/140; 362/144

(58) Field of Classification Search ............. 362/492, 362/135, 137, 140, 144, 488, 371, 282, 136, 362/656, 274

See application file for complete search history.

(56) References Cited

U.S. PATENT DOCUMENTS

| | | | |
|---|---|---|---|
| 4,213,169 A | | 7/1980 | Kempkers |
| 4,491,899 A | | 1/1985 | Fleming |
| 4,760,503 A | | 7/1988 | VandenBerge et al. |
| 4,866,579 A | | 9/1989 | Miller et al. |
| 4,997,228 A | | 3/1991 | Kempkers |
| 5,078,445 A | | 1/1992 | VandenBerge et al. |
| 5,098,150 A | | 3/1992 | Smith et al. |
| 5,117,337 A | | 5/1992 | Sakuma |
| 5,267,090 A | * | 11/1993 | Dowd et al. ............... 359/838 |
| 5,331,518 A | | 7/1994 | Roark et al. |
| 5,685,629 A | * | 11/1997 | Hemmeke et al. .......... 362/140 |
| 5,727,837 A | | 3/1998 | Viertel |
| 5,860,690 A | | 1/1999 | Dellinger et al. |
| 6,012,757 A | | 1/2000 | Viertel et al. |
| 6,325,527 B1 | | 12/2001 | Lee |
| 6,435,593 B2 | | 8/2002 | Welter |

* cited by examiner

*Primary Examiner*—Sharon E. Payne
(74) *Attorney, Agent, or Firm*—Price, Heneveld, Cooper, DeWitt & Litton, LLP

(57) ABSTRACT

A vanity mirror frame (70) has insert-molded electrical contacts (117, 118) for holding a lamp in place in the frame and which, when assembled to a visor core, makes aligned electrical connections with the visor core electrical supply. Further, the vanity mirror frame includes a unique socket (78) for pivotally receiving and holding a mirror cover in place. Detent springs extend between the frame and cover for snap opening and closing of the cover between closed and open positions. The cover includes an additional cam (95, 97) which cooperates with an electrical switch when the cover is open to provide operating power to the lamp.

25 Claims, 11 Drawing Sheets

COVERED ILLUMINATED VANITY MIRROR ASSEMBLY

BACKGROUND OF THE INVENTION

The present invention relates to a vehicle visor and particularly to an illuminated vanity mirror assembly for a vehicle visor.

Illuminated vanity mirror visors have become a popular option used in many vehicles. In order to provide a maximum sized mirror for practical use in relatively small visors, it is desirable to provide a compact vanity mirror assembly for illuminating a vanity mirror and one which includes a cover for the mirror when not in use. It is also desirable to have a relatively thin, lightweight visor and vanity mirror assembly, particularly when used in compact vehicles.

Prior visor assemblies have incorporated a variety of cover and hinge assemblies, some of which employ actuation cams for controlling a switch for selectively providing electrical power for a lamp when the cover is in an open position for use of the vanity mirror. Most also include spring actuated covers for holding the cover in an open or a closed position. Such construction is represented in U.S. Pat. Nos. 4,213,169; 4,491,899; 4,760,503; 4,866,579; 4,997,228; 5,078,445; 5,098,150; 5,331,518; and 6,012,757. Although these approaches have been useful, there remains a need for a relatively compact, inexpensive covered illuminated vanity mirror visor assembly which itself is easy to assemble as well as easy to assemble to a visor and, therefore, is less expensive to manufacture.

SUMMARY OF THE INVENTION

The vanity mirror assembly of the present invention satisfies these needs by providing a vanity mirror frame which in one embodiment has an insert-molded electrical circuit which includes contacts defining a lamp receiving socket in the vanity mirror frame, an actuation switch, and contacts which, when assembled to a visor core, align with electrical conductors in the core to couple to the visor core electrical supply, thereby eliminating separate manual connection steps during assembly of the visor. Further, the vanity mirror frame includes a unique socket for the snap-in assembly of pivot axles of the cover. The cover includes at least one cam for engaging a detent spring extending between the frame and cover for biased opening and closing of the cover between held closed and held open use positions. One of the axles includes a cam which cooperates with the switch when the cover is open to provide operating power to the lamp.

In a preferred embodiment of the invention, a lens is snap-fitted to the mirror frame and is positioned to lock one pivot axel of the cover in a mating cradle. This invention also contemplates the combination of an electrical component, such a vanity mirror assembly, with a visor having a core with apertures aligned to receive mounting tabs on the component and apertures aligned with electrical conductors in the core to couple to contacts in the component for electrically and mechanically coupling the component to the visor core. The resultant construction can be used for an illuminated vanity mirror or other accessories, such as garage door opening transmitters, memo recorders, or the like.

These and other features, objects and advantages of the present invention will become apparent upon reading the following description thereof together with reference to the accompanying drawings.

DETAILED DESCRIPTION OF THE PREFERRED EMBODIMENT

Figure 1:
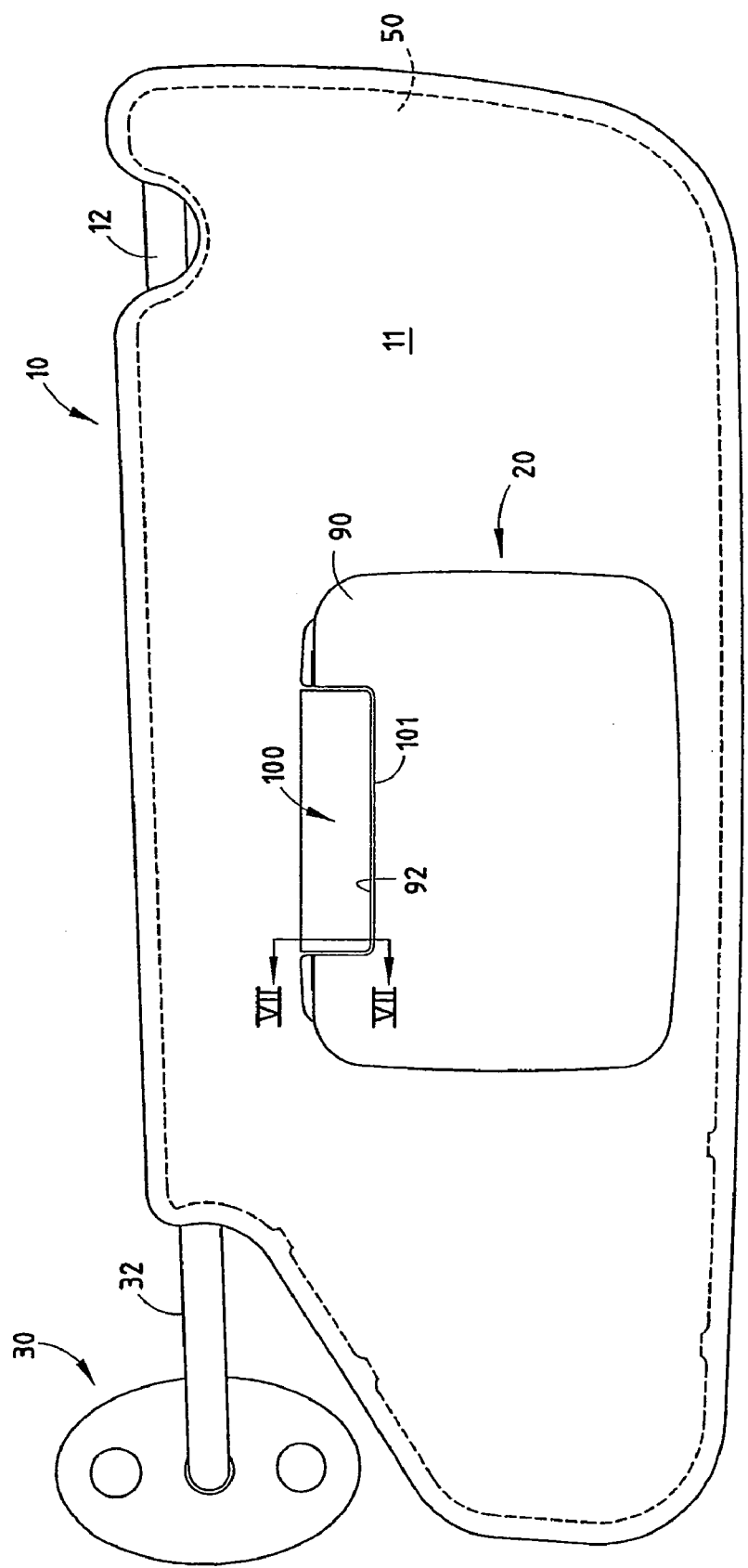
FIG. 1 is a front elevational view of a visor and vanity mirror assembly embodying the present invention.
Figure 2:
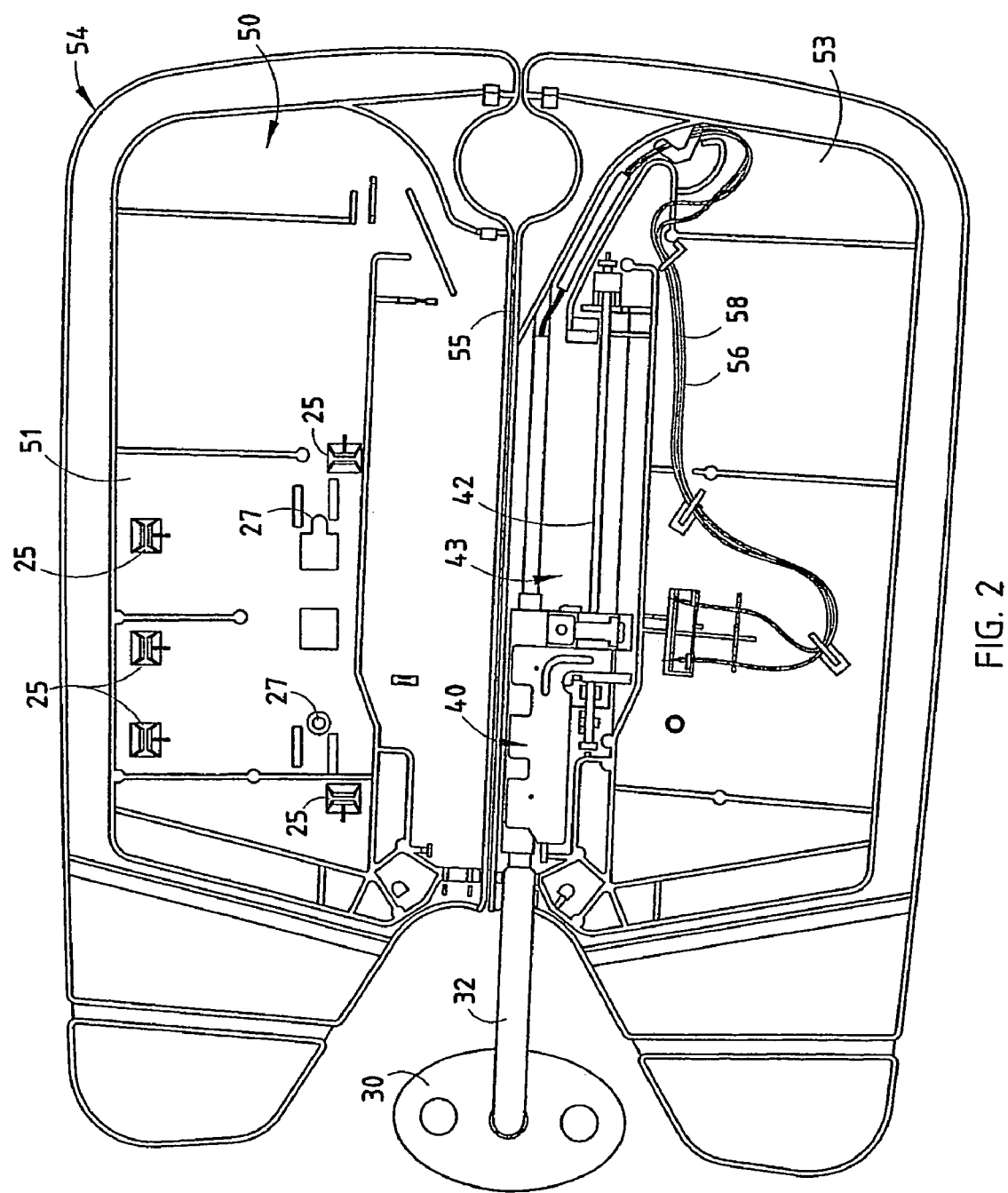
FIG. 2 is a top plan view of the body of the visor of FIG. 1 shown in an open position exposing the interior components of the visor.

Referring initially to FIG. 1, there is shown a visor 10 embodying the present invention and which includes an illuminated vanity mirror assembly 20. Visor 10 also includes a pivot rod assembly 30 for attaching the visor to a vehicle roof in a conventional manner to allow the visor to pivot about a pivot rod 32, between a raised stored position against the vehicle headliner to a lowered use position, and pivot to a side window position if desired. The visor rod 32 is mounted to the visor body by torque control and slide assembly 40, as illustrated in FIG. 2. Slide assembly 40 is mounted within a channel 43 and slides along a rod 42 mounted within the visor core 54 to allow the visor to also be adjustably moved along the pivot rod 32. The torque and slide assembly 40 is disclosed in greater detail in PCT Application No. PCT/US03/31130, entitled SLIDING VISOR, filed on Oct. 1, 2003. Core 50 is covered by a suitable upholstery material 11. Visor 10 also includes an auxiliary visor clip 12 which is removably mounted to a socket on the vehicle to allow the pivoting of the visor from a front windshield position to a side window position, as desired.

Figure 3:
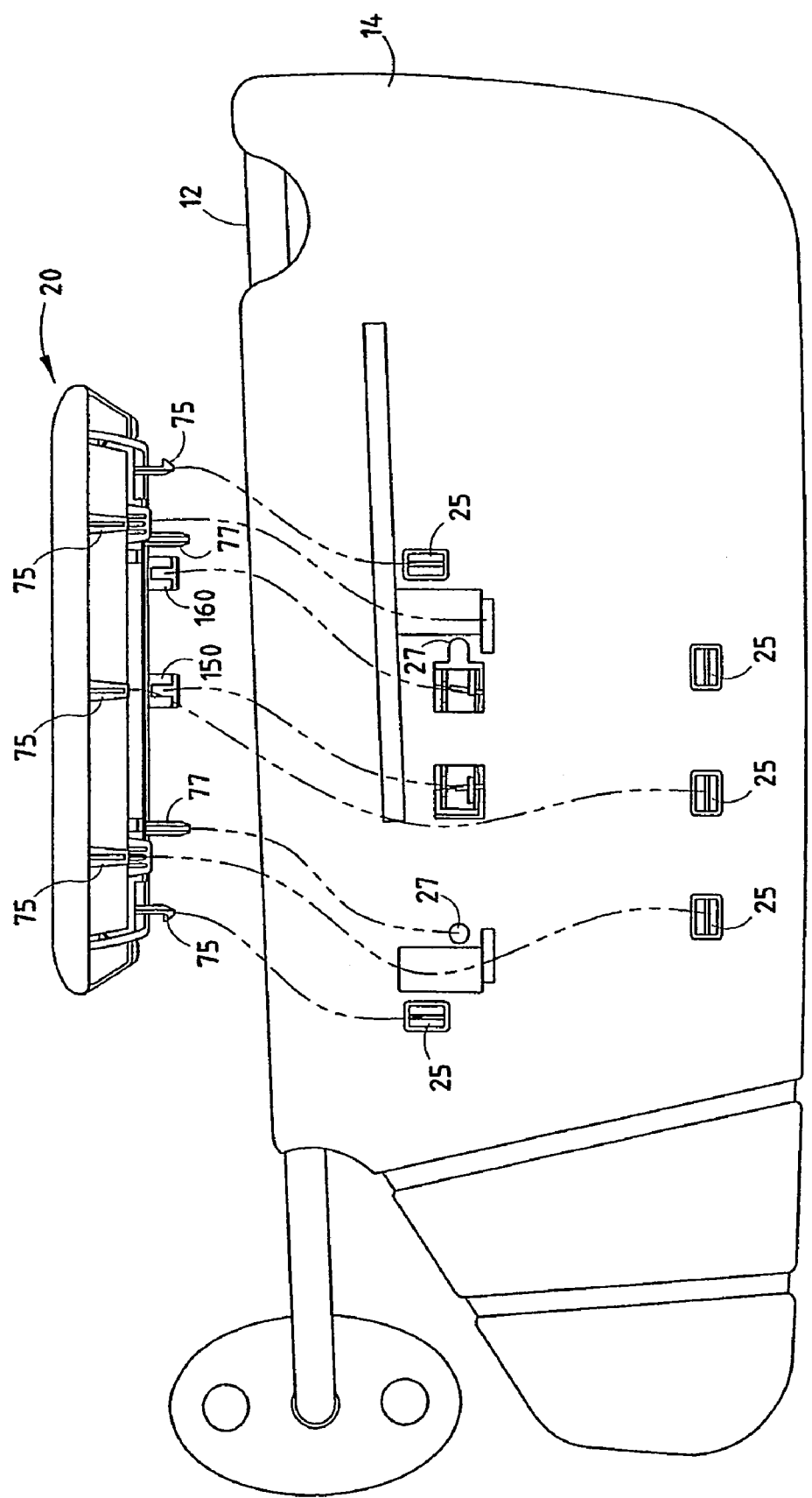
FIG. 3 is a front elevational view of the visor shown in FIG. 1 with the upholstery removed and a vanity mirror assembly broken away to illustrate the mounting of the vanity mirror assembly onto the visor body.
Figure 16:
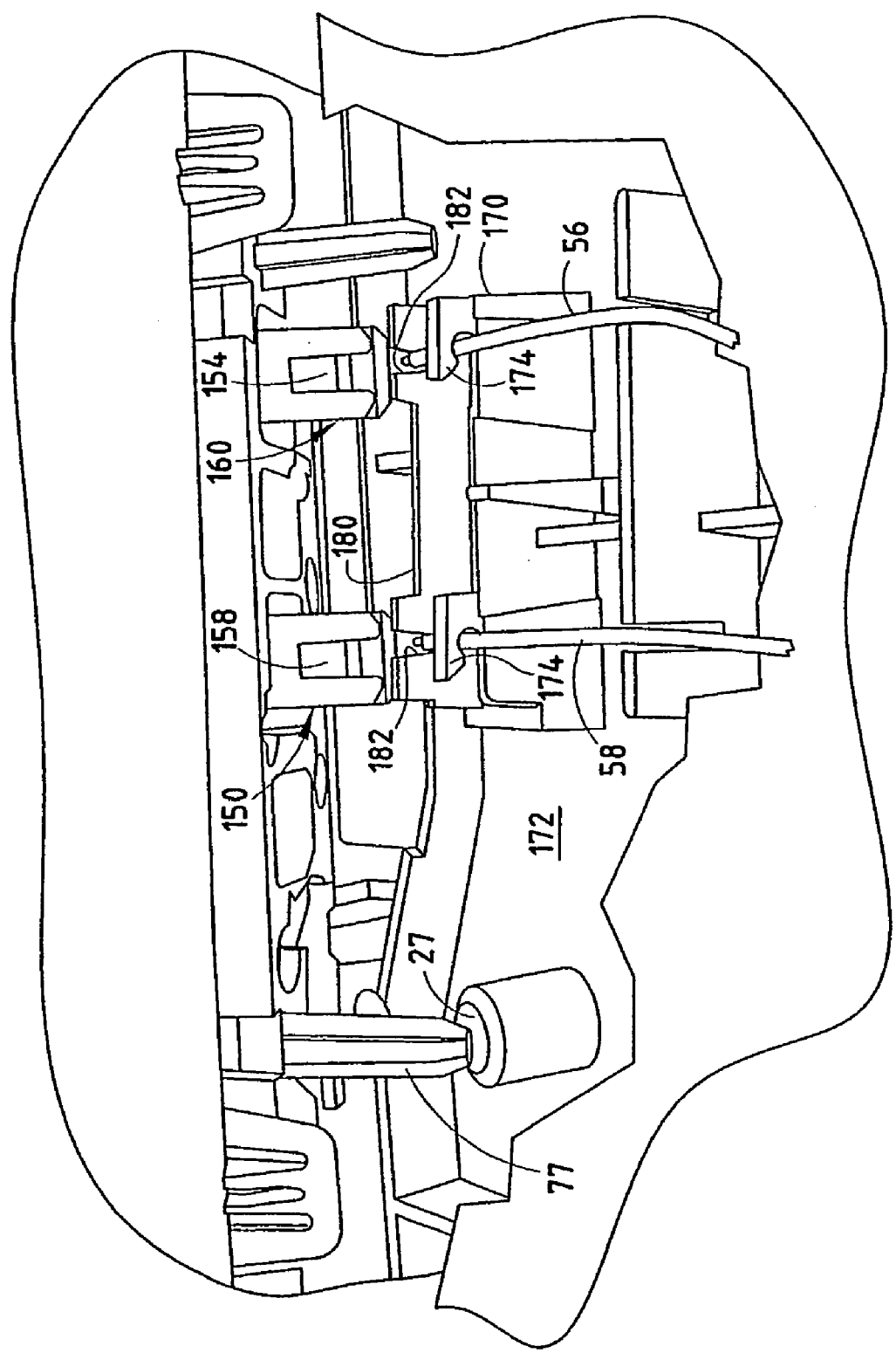
FIG. 16 is an enlarged fragmentary perspective view of the visor core and vanity mirror shown during assembly of the vanity mirror package to the visor core, as also illustrated in FIG. 3.
Figure 18:
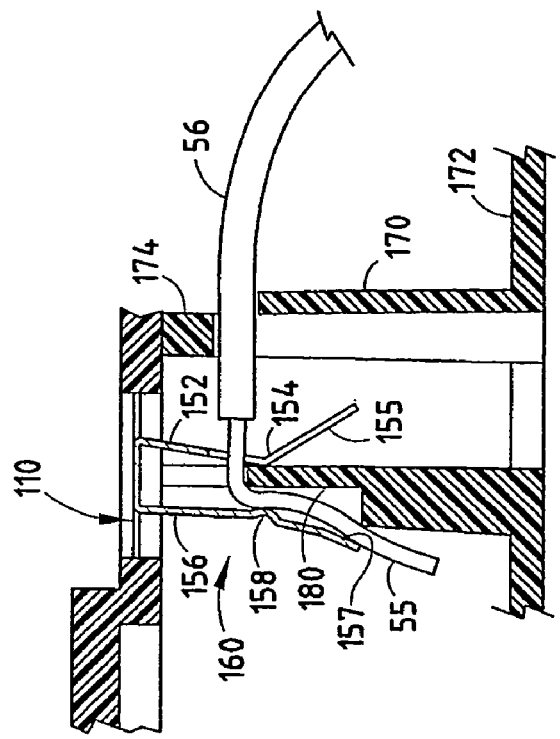
FIG. 18 is a greatly enlarged vertical cross-sectional view of the structure shown in FIG. 17 once the vanity mirror assembly has been mounted to the visor body.
Figure 17:
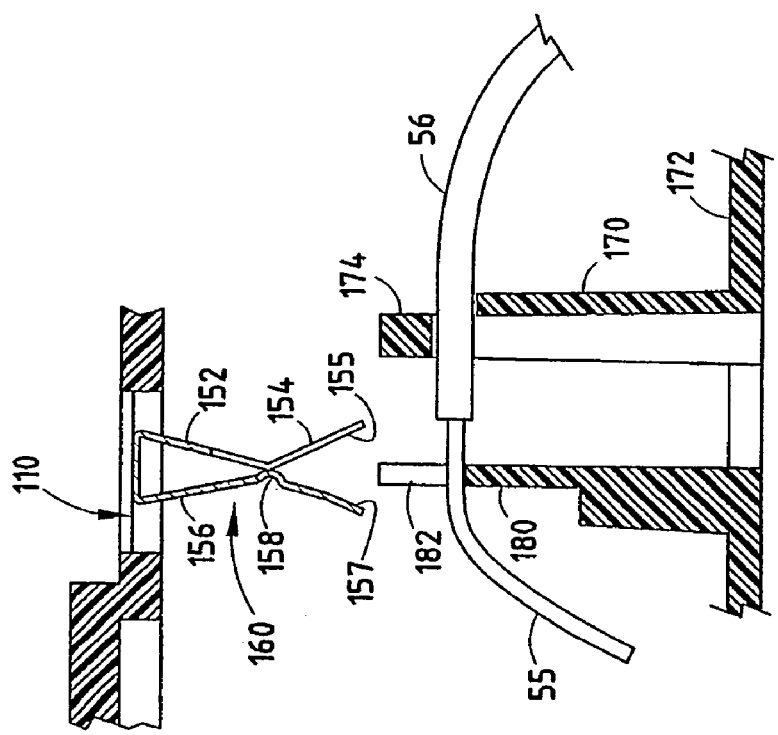
FIG. 17 is a greatly enlarged fragmentary vertical cross-sectional view illustrating the electrical connection of the vanity mirror circuit to the conductors contained within the visor body during assembly.

The visor body 50 mechanically and electrically receives a snap-in vanity mirror assembly 20, as illustrated in FIG. 3 and described in detail below. The visor body 50 preferably comprises a core 54 made of core halves 51 and 53 molded of a suitable polymeric material, such as polypropylene. Core halves 51 and 53 are hinged along a hinge line 55 (FIG. 2) and are folded together and secured to one another to define the visor body. Pivot rod 32 is a hollow pivot rod, which receives a pair of electrical conductors 56 and 58 which, as described below in connection with FIGS. 16-18, are insulated conductors with stripped ends positioned by positioning ledges to allow the electrical interconnection of the vanity mirror assembly 20 to the visor core 54 to provide electrical operating power to the illuminated vanity mirror assembly 20.

Vanity mirror assembly 20, as well as the visor core, include unique elements, individually and in combination. The vanity mirror assembly 20 has a snap-in cover for the vanity mirror which allows ease of assembly and which is locked in place by a snap-in lens. Further, the vanity mirror assembly includes a molded-in-place electrical circuit which defines switch contacts for selectively applying operating power to a lamp mounted within a socket integrally formed with the electrical circuit, as well as contacts which engage the conductors 56 and 58 of the visor core once the vanity mirror package is assembled to the core. Thus, vanity mirror assembly 20 includes both mechanical and electrical features which allow the relatively easy assembly and which greatly reduce the cost of the illuminated vanity mirror assembly. Assembly 20 can be employed with a variety of visor bodies having different shapes and sizes and need not be limited to a sliding visor, such as described in the preferred embodiment.

Vanity mirror assembly 20 includes a mirror frame 70 on which a cover 90 is pivotally mounted and a snap-in lens 100, which secures the cover to the frame, as described below in connection with FIG. 5. The cover includes a rectangular recess 92 which, as seen in FIG. 1, has edges which surround lens 100 when the cover is closed. In some embodiments, the cover may be designed to extend over the lens and in other embodiments, such as shown in FIG. 1, the lamp associated with lens 100 can be actuated separately from the cover movement to provide a map reading light.

Figure 4:
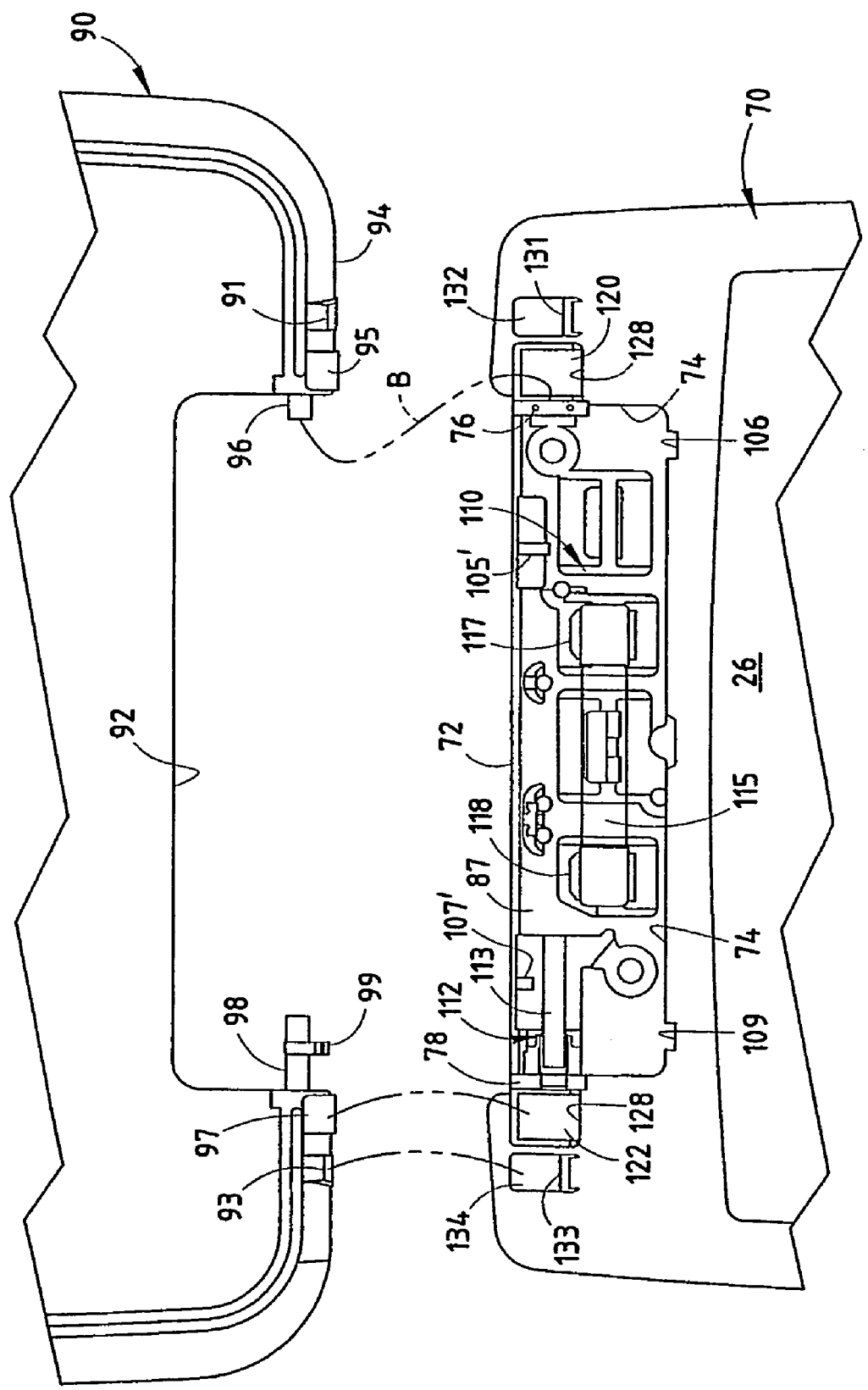
FIG. 4 is an enlarged fragmentary perspective view, partly exploded, of the frame and cover of the vanity mirror assembly.
Figure 10:
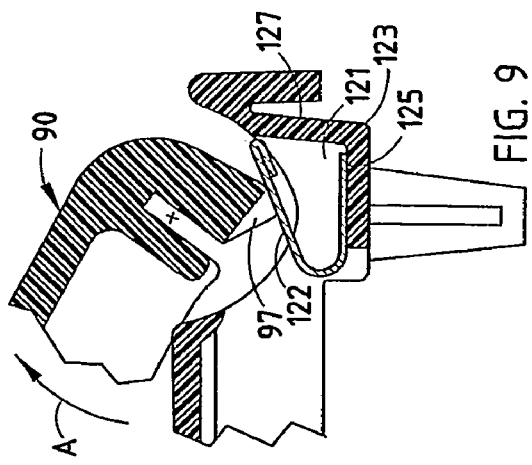
FIG. 10 is an enlarged fragmentary cross-sectional view taken along section line X-X of FIG. 6, showing the cover in an open position.
Figure 13:
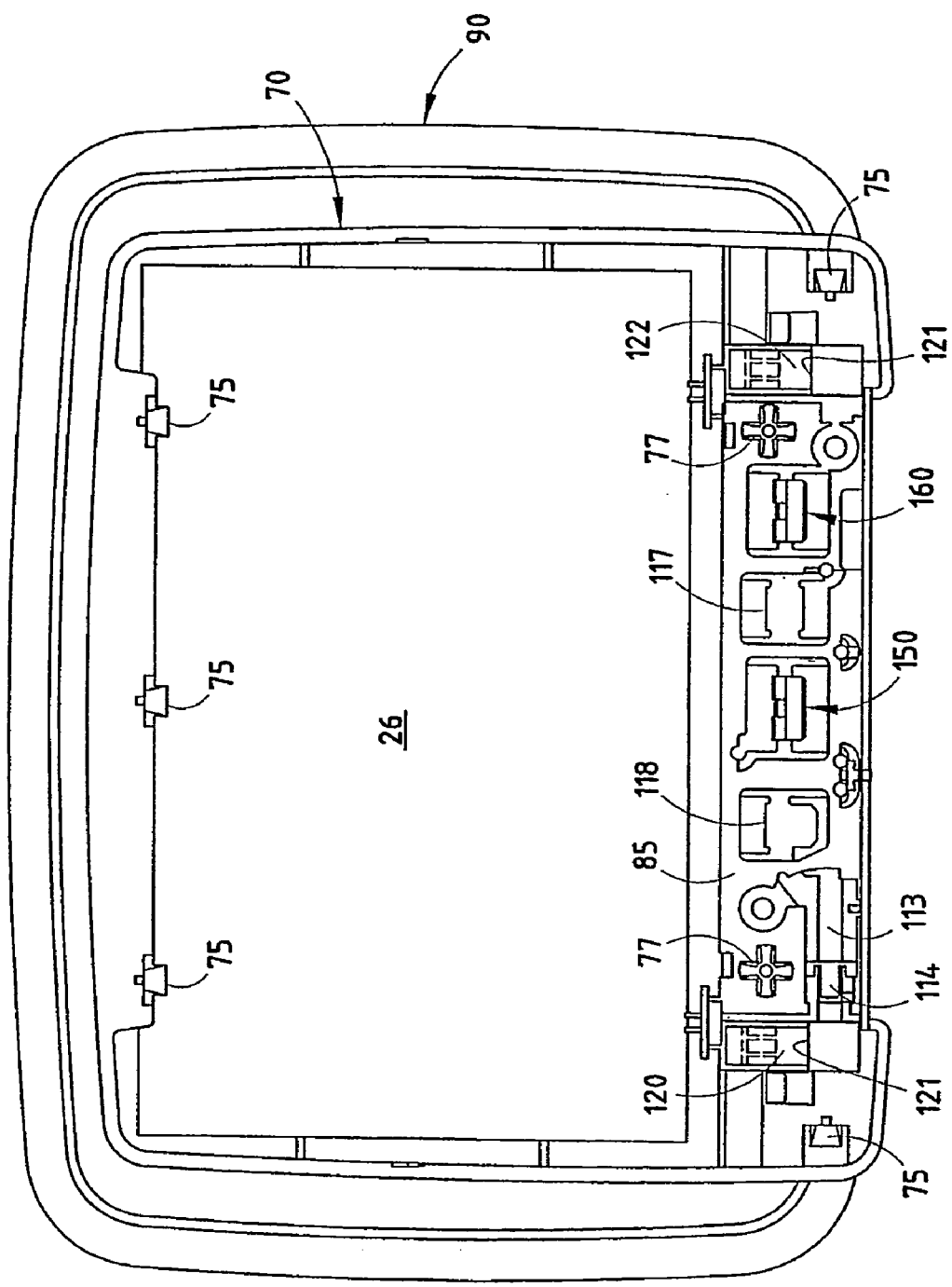
FIG. 13 is an enlarged rear plan view of the vanity mirror assembly shown in FIG. 1.

The mirror frame is also seen in the reverse view of FIG. 13 and supports therein, as seen in FIGS. 4 and 13, a mirror 26 which is exposed when the cover 90 is in an open position, as illustrated in FIGS. 4 and 10. Frame 70 is a generally rectangular frame molded of a suitable polymeric material, such as polycarbonate, and integrally includes an insert-molded electrical circuit 110 extending along a top edge 72 of the frame, as seen in FIGS. 4, 6, 14, and 15.

Figure 5:
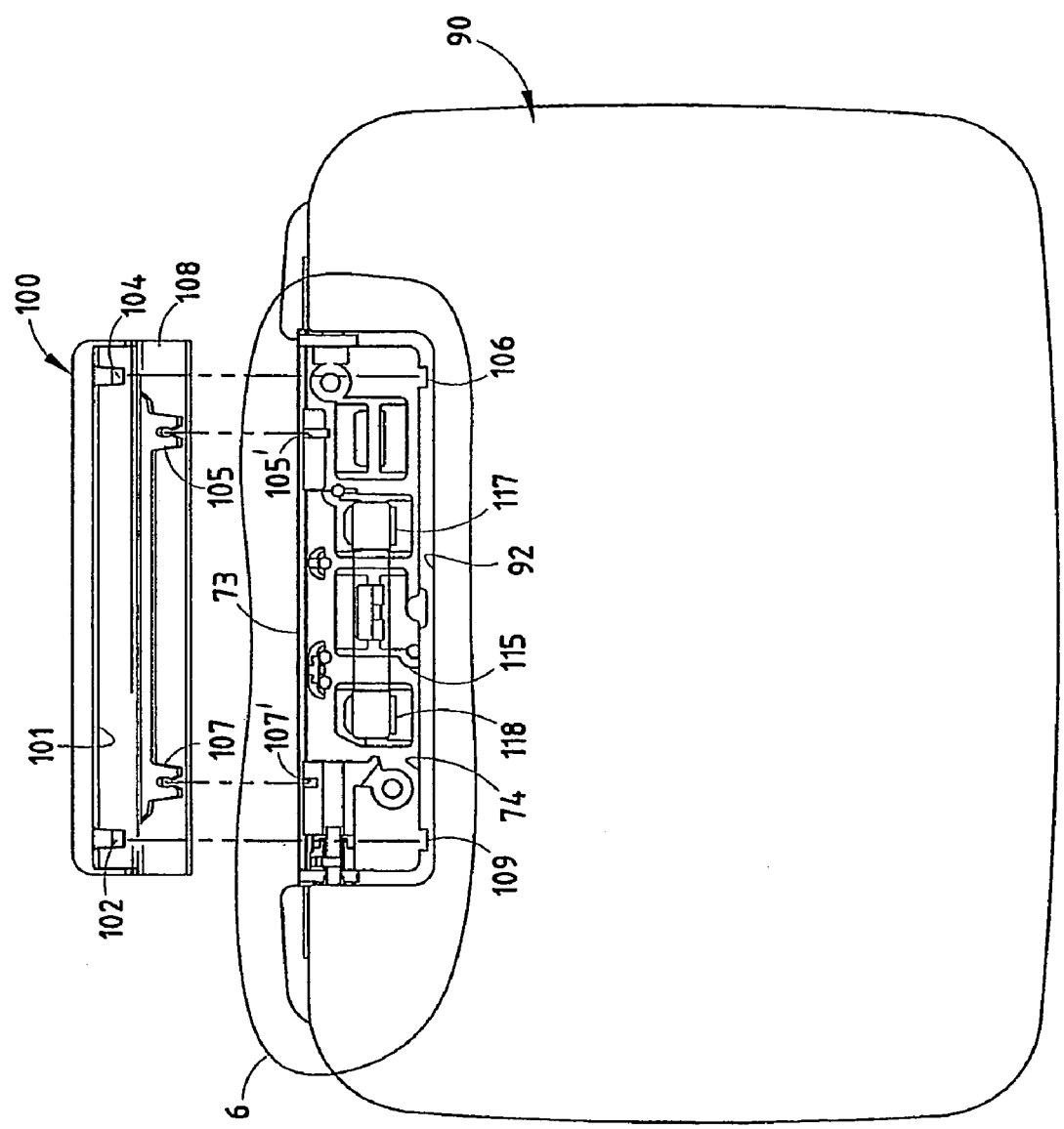
FIG. 5 is a front elevational view, party exploded away, of the vanity mirror assembly, showing the lens and its mounting structure.
Figure 6:
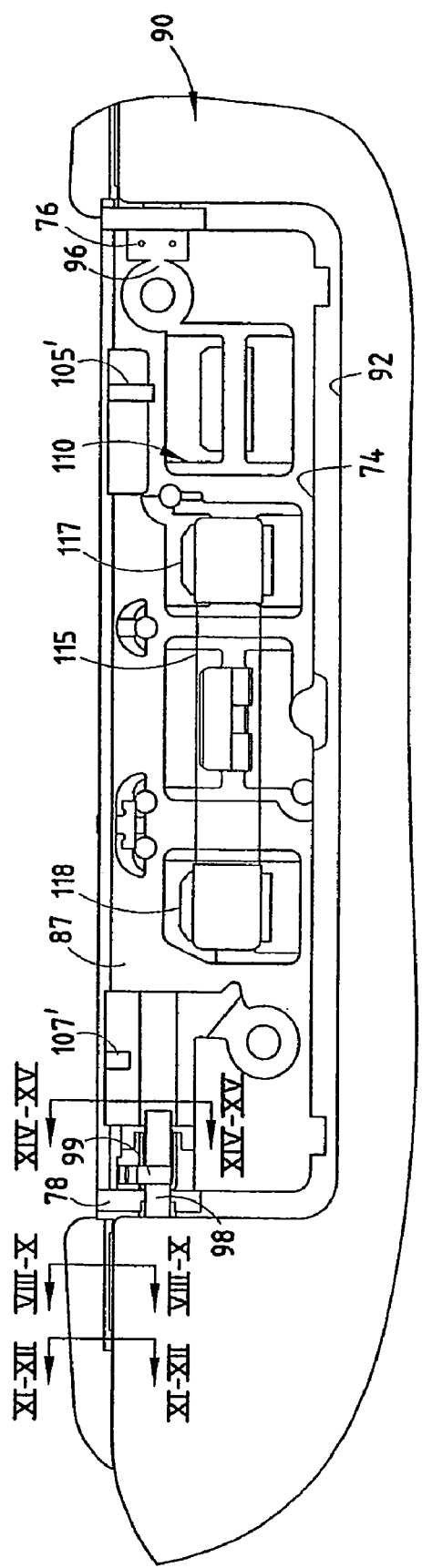
FIG. 6 is a greatly enlarged fragmentary front elevational view of the encircled structure shown in FIG. 5.
Figure 7:
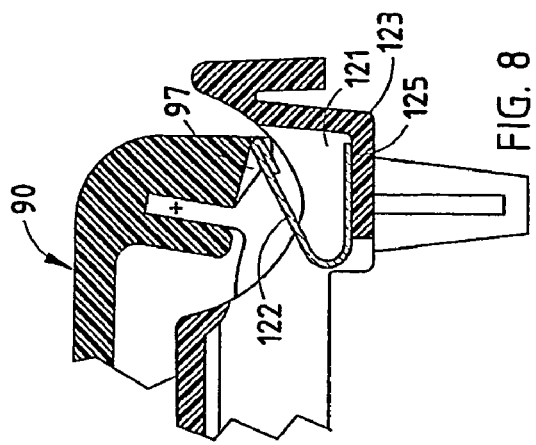
FIG. 7 is a greatly enlarged cross-sectional view taken along section line VII-VII of FIG. 1, showing the locking of one of the cover pivot axles by the lens when installed as illustrated in FIG. 5.

As seen in FIGS. 4-6, frame 70 includes a generally rectangular opening 74 above the mirror, which receives a cartridge-type lamp 115 associated with the electrical circuit and over which the lens 100 extends once assembled. The opening includes a closed cylindrical socket 76 at one end and a longitudinally spaced semicircular open cylindrical socket 78 defined by arcuate sections 79 and 81, as best seen in FIG. 7, for snap-in receiving a pivot axle 98 of the cover as described below. Cover 90 includes a first inwardly projecting pivot axle 96 which extends as shown by dashed line B in FIG. 4 through the cylindrical opening of socket 76. When so inserted, pivot axle 98 projecting inwardly from the opposed edges of a rectangular recess 92 of cover 90 is aligned with socket 78 and snap-fits between the resilient legs 79 and 81 defining socket 78.

Figure 8:
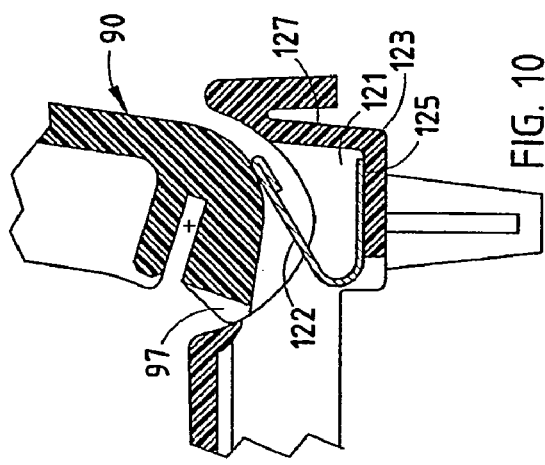
FIG. 8 is an enlarged fragmentary cross-sectional view taken along section line VIII-VIII of FIG. 6, illustrating the operation of one of the cover detent springs shown in a cover closed position.
Figure 9:
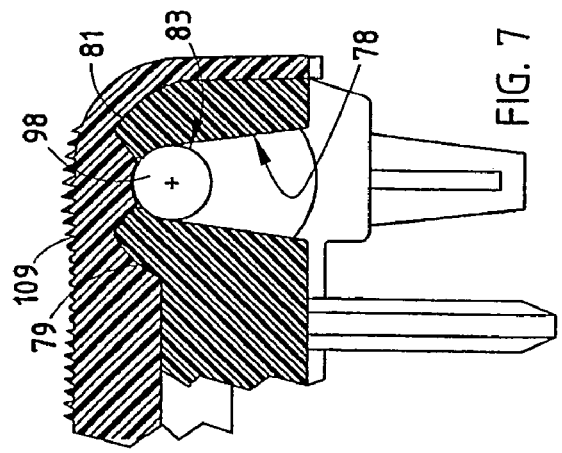
FIG. 9 is an enlarged fragmentary cross-sectional view of the structure shown in FIG. 8, taken along section line IX-IX of FIG. 6, showing the cover moving toward an open position as indicated by arrow A in FIG. 9.
Figure 12:
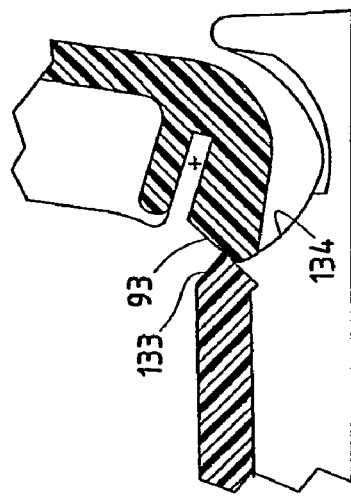
FIG. 12 is an enlarged fragmentary cross-sectional view taken along section line XII-XII of FIG. 6, with the cover shown in an open position with the cover stop engaging the frame.
Figure 11:
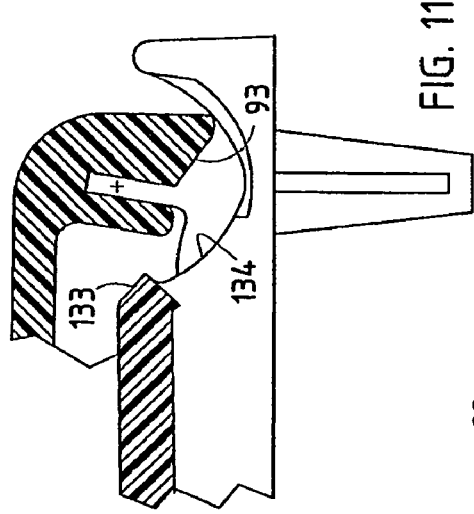
FIG. 11 is an enlarged fragmentary cross-sectional view taken along section line XI-XI of FIG. 6, showing the cover stop with the cover in a closed position.

Cover 90 is made of a suitable material and may be integrally molded of a polymeric material, such as polycarbonate, and includes along its upper edge 94 a pair of cams 95 and 97 which engage generally U-shaped compression springs 120, 122, respectively, as best seen in FIGS. 8-10, for controlling the snap-open and snap-closed positioning of cover 90 with respect to mirror frame 70. Each of the springs 120, 122 are mounted within spring-holding sockets 121, as best seen in FIGS. 8-10 and 13. Sockets 121 are suitably defined by a floor 125, a rear wall 127, and a top wall 128 (FIG. 4) which captively holds each of the springs 120, 122 in position on the mirror frame and in alignment with cams 95 and 97 of cover 90. Cover 90 also includes safety stops 91 and 93 which, as seen in FIGS. 11 and 12, engage stop tabs 131 and 133 when the cover is in a fully open position to limit the extent of travel such that the cover cannot be in a position with its open edge facing directly toward the head of an occupant. The stops 131, 133 are formed at the edge of recessed pockets 132, 134, respectively, as seen in FIGS. 4, 11, and 12.

Figure 15:
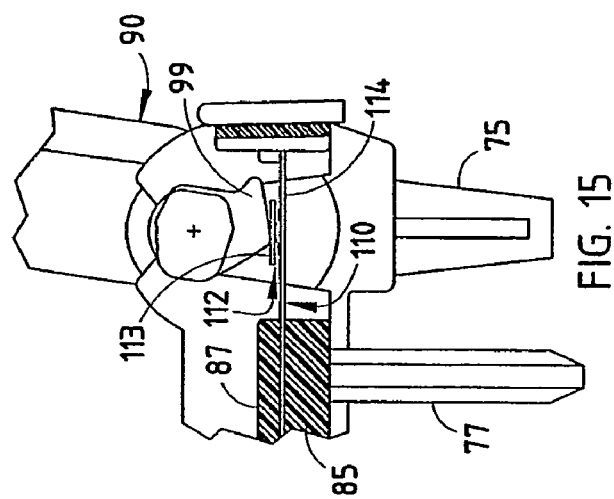
FIG. 15 is an enlarged fragmentary cross-sectional view taken along section line XV-XV in FIG. 6, illustrating the operation of the axle cam in cooperation with the electrical switch of the vanity mirror assembly, shown with the switch in a closed position.
Figure 14:
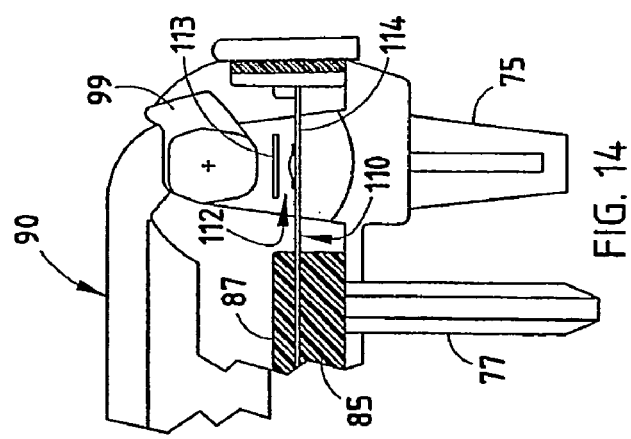
FIG. 14 is an enlarged fragmentary cross-sectional view taken along section line XIV-XIV in FIG. 6, illustrating the operation of the axle cam in cooperation with the electrical switch of the vanity mirror assembly, shown with the switch in an open position.

The second pivot rod 98 of cover 90 includes a switch actuating cam 99 (FIG. 4), which, as illustrated in connection with the electrical circuit operation of FIGS. 14 and 15, closes the electrical switch when cover 90 is moved from a closed position, shown in FIG. 14, to an open position, shown in FIG. 15. The detail of the operation of the cover-actuated switch is presented after a description of the assembly of the cover to the mirror frame and its locking in position with lens 100 has been presented.

Cover 70 is positioned and snap-locked within frame 90, as best seen in FIGS. 4-7, by first inserting the end of stub axle 96 into the cylindrical opening of enclosed socket 76 and aligning pivot axle 98 between the tapered opening 83 (FIG. 7) of semicylindrical socket 76 and pushing downwardly on pivot axle 98 to snap the cover into the sockets. This assembly process takes place after lamp 115 has been positioned within the lamp socket defined by a pair of semicylindrical electrical spaced-apart contacts 117 and 118 (FIG. 4), which receives the cartridge-type lamp 115. Once the cover has been positioned and snapped into the frame, cams 95 and 97 align with springs 120 and 122, respectively, and stops 91 and 93 align with locking tabs 131 and 133.

To prevent removal of the cover and to enclose the lamp 115, the lens 100 is employed to positively lock the axle 98 of cover 90 in position. Lens 100 is generally rectangular to enclose the rectangular opening 74 of the frame and the otherwise exposed electrical circuit 110. The lens includes a pair of locking tabs 102 and 104 along its edge 101 (FIG. 5), which fit within open slots 106, 109 on the lower edge of rectangular aperture 74, which are formed in frame 70 to receive the tabs. Thus, the lower leading edge of lens 100 is first positioned within slots 106, 109, after which a pair of snap-locking socket members 105, 107 are positioned in spaced relationship to the rear wall 108 of lens 100 and are pushed downwardly and snap over cylindrical posts 105' and 107' extending downwardly from the rear wall 73 of frame 70. When lens 100 is so engaged with the frame 70 as best seen in FIG. 7, lens 100 includes a semicylindrical section 109 which extends within the opening 83 of semicylindrical socket 78 and includes an arcuate surface which engages the pivot rod 98 and positively holds pivot rod 98 within socket 78 to prevent the cover 90 from disengaging from frame 70. Thus, the combination of the enclosed cylindrical socket 76, the open semicylindrical socket 78, and the pivot axles together with lens 100 provide a snap-together cover and frame with positive locking interconnection of the cover to the frame.

The frame further includes a plurality of spaced-apart locking tabs 75 (FIG. 3), which fit within and positively lock the vanity mirror assembly 20 within receiving slots 25 formed in the visor core 54 to mechanically couple the vanity mirror assembly 20 to the visor. The frame 70 also includes locator posts 77 which extend outwardly from the frame a greater distance than the locking tabs 75 and extend within sockets 27 in visor body 14 to facilitate alignment and assembly, which not only mechanically secures the vanity mirror assembly 20 to the visor body 14 but, as described below, provides electrical coupling of the circuit 110 in frame 70 to conductors 56, 58 in core 54.

Electrical circuit 110 is insert-molded between the floor 85 (FIGS. 13-15) of the upper section of frame 70 and a top wall 87 (FIGS. 6, 14, and 15), such that the contacts 117, 118 forming the lamp socket extend toward the front of the frame for receiving lamp 115 and a pair of contacts 150, 160 extend downwardly toward the visor core for engaging conductors 56, 58 as described below. One of the contacts 150 is coupled to the system ground, while the other contact 160 is coupled to the system's positive supply, as will lamp socket sections 117, 118. The circuit also defines an electrical switch 112 comprising a movable contact 113 and a fixed contact 114, and which, as seen in FIGS. 14 and 15, is actuated by cam 99 to move switch movable contact 113 into engagement with fixed contact 114 to close the electrical circuit and apply operating power to lamp 115 when the cover is moved to an open position. The geometry of contacts 150 and 160, together with the training and holding of conductors 56 and 58 to provide mechanical securing of vanity mirror assembly to the visor body while simultaneously providing electrical inter-coupling thereto is now described in connection with FIGS. 16-19.

Contacts 150 and 160, as best seen in FIGS. 18 and 19, are spring clips integrally formed with the stamped electrical circuit 110, which is made of stainless steel, to provide sufficient compressive force for the contacts 150 and 160 to lockably engage and secure to the stripped ends 55 of the conductors 56 and 58 when vanity mirror assembly 20 is mounted to the visor body. Each of the contacts 150, 160 include, as seen in FIGS. 17 and 18, a first wall 152 having a generally U-shaped slot 154 formed therein and a second wall 156, with the walls being configured to converge outwardly at ends 155 and 157. An annular section 158 on wall 156 extends into engagement with the legs defining slot 154 and extends across slot 154, as best seen in FIGS. 16 and 17.

The visor core 54 includes a first ledge 170 extending upwardly from the floor 172 thereof and including a hook 174 into which the insulated section of a conductor, such as conductors 56 and 58, are held as seen in FIGS. 16-18. Each of the conductors has a stripped end 55 which extends within a V-shaped notch 182 formed in a second ledge 180 extending upwardly from floor 172 in spaced relationship to ledge 170. The stripped end 55 extends over the floor of the notch 182, as best seen in FIGS. 17 and 18, and, as the vanity mirror assembly 20 is positioned by locator pins 77 onto the core and pressed into engagement with locking tabs 75 engaging slots 25 in the core (FIGS. 3 and 16), the open end of clips 150 and 160 extend over the top of ledge 180 in alignment with slots 154 of each clip spanning the stripped end 55 of each of the conductors 56 and 58. As the vanity mirror assembly is pressed downwardly into locking engagement with the visor core, clip contacts 150 and 160 engage and lock over the stripped ends 55 of conductors 56 and 56, as seen in FIG. 18, to provide a positive electrical connection with circuit 110. Circuit 110 selectively applies operating power from the vehicle's power system through conductors 56 and 58 through switch 112 to lamp 115 when cover 90 is moved to an open position.

Thus, with the system of the present invention, a vanity mirror package is provided which provides a snap-together cover and lens and an insert-molded electrical circuit which interconnects by snapping the vanity mirror assembly into position against a visor core to make both electrical and mechanical connection to the visor core in a relatively quick and, therefore, inexpensive assembly process. Although an illuminated vanity mirror package 20 is illustrated in connection with the visor of the present invention, other housings with electrical components may employ the unique circuit interconnection of this invention for providing electrical interconnection of an electrical component in a housing to a visor body which includes electrical conductors therein. Thus, a snap-in housing for a Homelink® brand programmable garage door opening transmitter or a memo recorder could be mechanically and electrically coupled to a visor having power conductors within the visor body utilizing the structure of the present invention.

It will become apparent to those skilled in the art that these and other modifications to the preferred embodiment of the invention as described herein can be made without departing from the spirit or scope of the invention as defined by the appended claims.

The invention claimed is:

1. A vanity mirror assembly comprising:
    a mirror frame adapted to receive a mirror therein and a lamp for the illumination of said mirror, said mirror frame including an enclosed cylindrical socket and an open semi cylindrical socket longitudinally spaced from said closed cylindrical socket;
    a cover having a first pivot axle extending within said enclosed cylindrical socket and a second pivot axle snap-fitted within said open semi cylindrical socket; and
    a lens adapted to snap fit within said mirror frame over said lamp, said lens including an edge which engages said second pivot axle to hold said cover in engagement with said mirror frame.

2. The assembly as defined in claim 1 wherein said mirror frame is molded of a polymeric material and includes an insert-molded electrical circuit including contacts adapted to engage conductors of a visor core when said vanity mirror assembly is mounted to a visor core.

3. The assembly as defined in claim 2 wherein said electrical circuit further defines a lamp socket for receiving said lamp.

4. The assembly as defined in claim 3 wherein said electrical circuit further includes a switch including a deflectable switch contact.

5. The assembly as defined in claim 4 wherein one of said first and second pivot axles of said cover includes a switch cam which selectively engages said deflectable contact for actuating said switch when said cover is in an open position to provide operating power to a lamp positioned in said lamp socket.

6. The assembly as defined in claim 5 wherein said frame includes at least one cover engaging spring and wherein said cover includes a cam engaging said spring for selectively holding said cover in open and closed positions.

7. The assembly as defined in claim 6 wherein said cover includes a recess which surrounds the lens and allows the cover to move with respect to the frame and lens.

8. An illuminated vanity mirror assembly comprising:
   a mirror frame adapted to receive a mirror therein, said mirror frame including a lamp for illuminating said mirror, said frame including a pair of spaced-apart cover receiving sockets near an edge of said frame, wherein one of said sockets comprises a cylindrical socket for captively holding a pivot axle therein and the other socket is an open socket for allowing the snap-in assembly of a cover to said frame, said frame further including at least one detent spring receiving socket; a detent spring positioned in said detent spring receiving socket;
   a cover including integrally formed first and second pivot axles wherein said first axle is inserted into said cylindrical socket and said second axle is snap-fitted within said open socket, said cover including a cam aligned with said detent spring for providing snap open and closed control of said cover; and
   a lens coupled to said frame for holding at least one of said cover pivot axles within said frame.

9. The assembly as defined in claim 8 wherein said mirror frame is molded of a polymeric material and includes an insert-molded electrical circuit including contacts adapted to engage conductors of a visor core when said vanity mirror assembly is mounted to a visor core.

10. The assembly as defined in claim 9 wherein said electrical circuit further defines a lamp socket for receiving a lamp.

11. The assembly as defined in claim 10 wherein said electrical circuit further includes a switch including a deflectable switch contact.

12. The assembly as defined in claim 11 wherein one pivot axle of said cover further includes a switch cam which selectively engages said deflectable contact for actuating said switch when said cover is in an open position to provide operating power to a lamp positioned in said lamp socket.

13. A visor and vanity mirror assembly comprising:
   a visor body having at least one electrical conductor for coupling to a vehicle electrical system; and
   a mirror frame adapted to receive a mirror therein, wherein said mirror frame is molded of a polymeric material and includes a pair of spaced-apart cover receiving sockets near an edge of said frame, wherein one of said sockets comprises a cylindrical socket for captively holding a pivot axle therein and the other socket is an open socket for allowing the snap-in assembly of a cover to said frame, said frame further including at least one detent spring receiving socket;
   a detent spring positioned in said detent spring receiving socket;
   a cover including integrally formed first and second pivot axles wherein said first axle is inserted into said cylindrical socket and said second axle is snap-fitted within said open socket, said cover including a cam aligned with said detent spring for providing snap open and closed control of said cover, and said frame further including an insert-molded electrical circuit which is coupled to an electrical component within said mirror frame and wherein said electrical circuit includes at least one contact adapted to engage said conductor of said visor body when said frame is assembled to said visor body for coupling an electrical supply available in said body to said electrical component.

14. The assembly as defined in claim 13 wherein said visor body includes at least one conductor holding ledge for positioning an insulated electrical conductor having a stripped end exposing the conductor in a position to be engaged by said contact of said electrical circuit.

15. A visor and vanity mirror assembly comprising:
   a visor body having at least one electrical conductor for coupling to a vehicle electrical system; and
   a mirror frame adapted to receive a mirror therein, wherein said mirror frame is molded of a polymeric material and includes an insert-molded electrical circuit which is coupled to an electrical component within said mirror frame and wherein said electrical circuit includes at least one contact adapted to engage said conductor of said visor body when said frame is assembled to said visor body for coupling an electrical supply available in said body to said electrical component, wherein said visor body includes at least one conductor holding ledge for positioning an insulated electrical conductor having a stripped end exposing the conductor in a position to be engaged by said contact of said electrical circuit, and wherein said visor body includes a first ledge including a hook for holding said conductor to said visor body and a second ledge including a notch for receiving and holding a stripped end of said conductor in a fixed position.

16. The assembly as defined in claim 15 wherein said contact of said electrical circuit includes a pair of spaced-apart spring loaded walls which extend over said second ledge of said visor body and compressibly engage said stripped end of said conductor held in said notch to make an electrical contact with said conductor when said frame is mounted to said visor body.

17. The assembly as defined in claim 16 wherein one of said walls of said contact includes a slot for surrounding said conductor when said frame is mounted to said visor body.

18. The assembly as defined in claim 17 wherein said electrical circuit is made of stainless steel.

19. The assembly as defined in claim 18 wherein said frame includes locking tabs and said visor body includes slots for securing said frame to said visor body.

20. The assembly as defined in claim 19 wherein said electrical component is a lamp for illuminating said mirror.

21. The assembly as defined in claim 20 and further including a cover pivotally mounted to said mirror frame and wherein circuit further includes a switch including a movable contact engaged by said cover for actuating said switch when said cover is in an open position to provide operating power to said lamp.

22. The assembly as defined in claim 21 wherein said mirror frame includes an enclosed cylindrical socket and an open semi cylindrical socket longitudinally spaced from said closed socket, said frame further including at least one detent spring receiving socket; and wherein said cover includes a first pivot axle extending within said closed cylindrical socket and a second pivot axle snap-fitted within said semi cylindrical socket, said cover including a cam associated with said cover; and

- a detent spring positioned within said detent spring receiving socket of said mirror frame and extending between said mirror frame and engaging an associated cam of said cover for providing snap open and close control of said cover.

23. The assembly as defined in claim 22 and further including a lens coupled to said frame for holding said second pivot axle within said semi cylindrical socket.

24. A visor and vanity mirror assembly comprising:

a visor body;

a mirror frame adapted to receive a mirror therein and cover receiving sockets near an edge of said frame for allowing the snap-in assembly of a cover to said frame;

a cover having first and second pivot axles for extending within said sockets; and a lens coupled to said frame for holding at least one of said cover pivot axles within said frame, wherein said sockets of said mirror frame include an enclosed cylindrical socket and an open semi cylindrical socket longitudinally spaced from said closed socket, and wherein said cover includes a first pivot axle extending within said closed cylindrical socket and a second pivot axle snap-fitted within said semi cylindrical socket; and said lens holds said second pivot axle in said semi cylindrical socket.

25. The assembly as defined in claim 24 wherein said mirror frame includes a lamp for illuminating said mirror and wherein said mirror frame is molded of a polymeric material and includes an insert-molded electrical circuit including contacts adapted to engage contacts of said visor body when said vanity mirror assembly is mounted to said visor body.

* * * * *

UNITED STATES PATENT AND TRADEMARK OFFICE
CERTIFICATE OF CORRECTION

| | | |
|---|---|---|
| PATENT NO. | : 7,311,427 B2 | Page 1 of 1 |
| APPLICATION NO. | : 10/535503 | |
| DATED | : December 25, 2007 | |
| INVENTOR(S) | : Barker et al. | |

It is certified that error appears in the above-identified patent and that said Letters Patent is hereby corrected as shown below:

On the Title page item (75),

Inventors: "Steven J. Cieholski, Holland, MI" should be --Steven J. Cicholski, Holland, MI--.

Signed and Sealed this

Nineteenth Day of January, 2010

David J. Kappos
*Director of the United States Patent and Trademark Office*